G. A. ARNOLD.
VALVE OPERATING AND LOCKING DEVICE.
APPLICATION FILED JUNE 28, 1915.

1,194,696.

Patented Aug. 15, 1916.

Inventor
George A. Arnold.
By Henry J. Miller
atty.

UNITED STATES PATENT OFFICE.

GEORGE A. ARNOLD, OF MIDDLETOWN, CONNECTICUT, ASSIGNOR TO ARNOLD ELECTRIC COMPANY, A CORPORATION OF MASSACHUSETTS.

VALVE OPERATING AND LOCKING DEVICE.

1,194,696.

Specification of Letters Patent. Patented Aug. 15, 1916.

Application filed June 28, 1915. Serial No. 36,702.

*To all whom it may concern:*

Be it known that I, GEORGE A. ARNOLD, a citizen of the United States, residing at Middletown, in the county of Middlesex and State of Connecticut, have invented certain new and useful Improvements in Valve Operating and Locking Devices, of which the following is a specification, reference being had to the accompanying drawings, forming part thereof.

This invention has reference to improvements in valve operating and locking devices and particularly to such devices adapted to operate and lock a slidable valve for controlling the flow of gas or air through the supply pipe of a combustion engine.

One object of the invention is to so construct a valve operating device that the actuating element therefor is constituted by a member of a locking mechanism whereby the operation of the valve and the bringing of the locking element to the locked position are coincident.

Another object of the invention is to simplify the construction and operation of valve locking devices.

The invention consists in the valve operating element and its combination with the rotary member of a locking device.

The invention also consists in such other novel features of construction and combination of parts as shall hereinafter be more fully described and pointed out in the claim.

Figure 1:
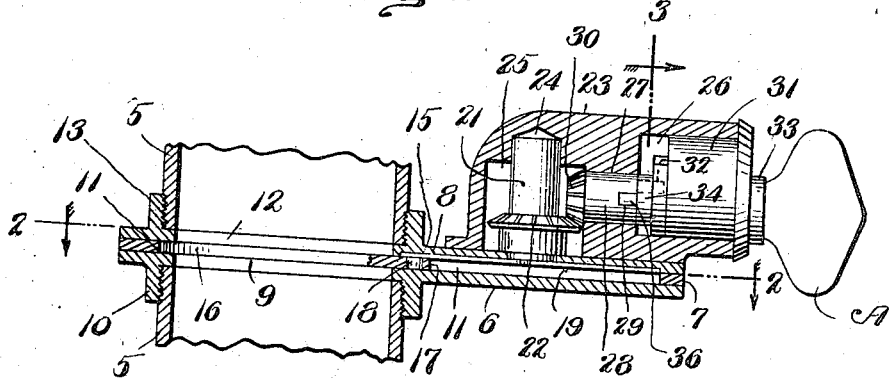
Figure 2:
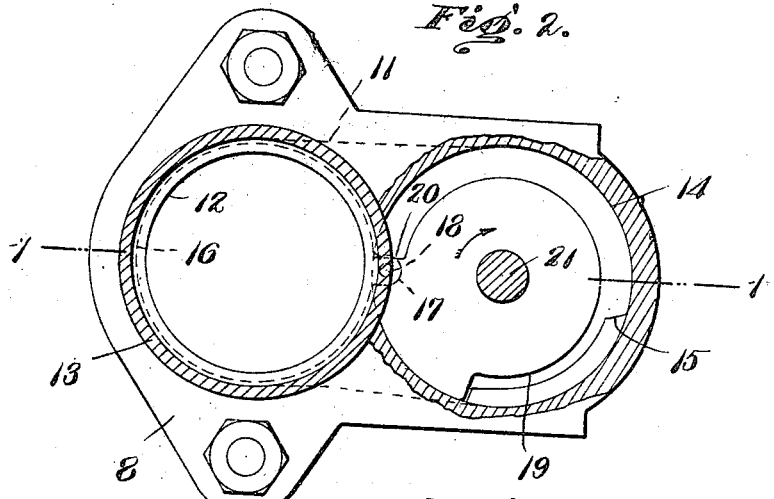
Figure 3:
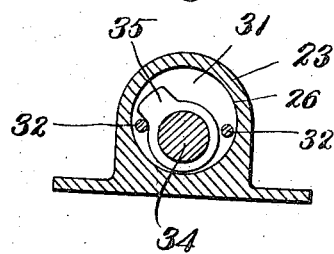

Figure 1, represents a sectional view of the improved valve operating and locking device as taken on a line 1—1 Fig. 2. Fig. 2, represents a similar view taken on line 2—2 Fig. 1. Fig. 3, represents a sectional view taken on line 3—3 Fig. 1 to show the stops.

As shown in the drawings, in its preferred form, 5 represents a portion of any pipe and particularly the fluid supply pipe adapted to communicate with the fuel supply of a combustion engine. Intersecting said supply pipe 5 is a valve casing or chamber having the members 6, 7 and 8. Member 6 has the opening 9 embraced by the lip 10 adapted to receive one of the pipe members 5. Member 7 is an open spacing member the opening 11 of which is of somewhat greater diameter than the opening 9 of member 6, to receive the edge portion of the valve, this opening 11 further constituting a receptacle or guide for the valve in its sliding movement. Member 8 has the opening 12 embraced by the lip 13, to receive the second pipe member 5, and has at its under side the circular bearing 14 having the stop shoulder 15.

In the opening 11 of member 7 is slidable the valve 16 having the perforated tongue 17 which is engaged with the pin 18 of the crank disk 19 which latter is rotatable in bearing 14 of member 8 and has the quadrant shoulder 20 adapted to be intercepted by the stop shoulder 15 to limit the rotative movement of this crank disk 19. This crank disk 19 has the shaft 21 which is journaled in a bearing of the member 8 and has the pinion 22.

Mounted on the member 8 is the frame 23 having the bearing 24, to receive the end of shaft 21, the pinion compartment 25 and the lock receiving bore 26 which communicates with the compartment 25 by the bearing 27. In this bearing 27 is journaled the shaft 28 having at one end the slot 29 and at the other end the pinion 30 which is engaged with the pinion 22.

Within the bore 26 of frame 23 is located the lock member 31 of any well known lock of the Yale type furnished at its inner end with the stop pins 32, 32. Rotatable in the lock member 31 is the key barrel 33 adapted to be rotated by the key A and having at its inner end the extension 34 furnished with the stop arm 35, which has a limited movement between pins 32, 32, and the projection 36 which is adapted to be engaged with the slot 29 of shaft 28.

By the use of the extension 34 and its projection 36 the rotatable member or barrel 33 of the lock is positively connected with shaft 28 through which the valve operating mechanism can be actuated. It is of course evident that the parts 28 and 34 may be lengthened if it is desired to place the lock member 31 farther from the valve mechanism than as shown in the drawings.

The operation of the device will be readily understood by reference to the drawings. When the key A is in place in the lock barrel 33 said barrel can be rotated until the stop arm 35 is arrested by one of the pins 32, 32. Through this rotation of barrel 33 motion is transmitted through shaft 28, pinions 30, 22, and shaft 21 to rotate the crank disk 19 and, through pin 18 to effect the sliding of valve 16 to open or close the pipe 5 as the case may be. After such operation key A may be removed and the valve is locked against unauthorized operation.

Having thus described my invention I claim as new and desire to secure by Letters Patent—

A valve operating and locking device comprising a valve casing having a slidable valve and a rotatable crank disk operatively connected with said valve, said disk having a shaft furnished with a pinion, a frame mounted on said valve casing and having a pinion compartment to receive said pinion, a bearing for said shaft, and a bearing and bore at right angles to said shaft, a shaft journaled in said latter bearing and having a pinion engaged with the pinion of said first shaft, and a lock located in said frame bore and having a key operated member operatively connected with said second shaft.

GEORGE A. ARNOLD.